US012737437B2

(12) United States Patent
Elton et al.

(10) Patent No.: US 12,737,437 B2
(45) Date of Patent: Sep. 15, 2026

(54) SYSTEMS AND METHODS FOR MAPPING A NETWORKED ENVIRONMENT WITH CROSS ACCOUNT CLUSTERING TO MONITORING AND/OR DETECT FRAUDULENT ENTITY NETWORKS

(71) Applicant: OPSEC ONLINE LIMITED, Washington (GB)

(72) Inventors: Timothy Allen Elton, Meridian, ID (US); Oleg V. Polishchuk, Chevy Chase, MD (US); Sassan Shahriary, Pleasanton, CA (US); Chun-Ying Lee, Fremont, CA (US); Daryle S. Fong, Santa Clara, CA (US); Sanjeev Karigowdanakoppalu, San Francisco, CA (US)

(73) Assignee: OpSec Online Limited, Washington (GB)

( * ) Notice: Subject to any disclaimer, the term of this patent is extended or adjusted under 35 U.S.C. 154(b) by 0 days.

(21) Appl. No.: 18/575,468

(22) PCT Filed: Jun. 30, 2022

(86) PCT No.: PCT/US2022/035813

§ 371 (c)(1),
(2) Date: Dec. 29, 2023

(87) PCT Pub. No.: WO2023/278763

PCT Pub. Date: Jan. 5, 2023

(65) Prior Publication Data

US 2024/0297897 A1 Sep. 5, 2024

Related U.S. Application Data

(60) Provisional application No. 63/216,878, filed on Jun. 30, 2021.

(51) Int. Cl.
*G06F 21/10* (2013.01)
*H04L 9/40* (2022.01)

(52) U.S. Cl.
CPC .......... *G06F 21/10* (2013.01); *H04L 63/1441* (2013.01)

(58) Field of Classification Search
CPC .... G06F 21/6245; G06F 21/10; G06F 21/577; G06F 21/6254; H04L 63/102; H04L 67/30; H04L 63/1441
(Continued)

(56) References Cited

U.S. PATENT DOCUMENTS

| | | |
|---|---|---|
| 9,912,695 B1 | 3/2018 | Chao et al. |
| 10,187,408 B1 | 1/2019 | Call et al. |

(Continued)

FOREIGN PATENT DOCUMENTS

| | | |
|---|---|---|
| CN | 109726318 A | 5/2019 |
| CN | 110138763 A | 8/2019 |

(Continued)

OTHER PUBLICATIONS

NPL Search Terms (Year: 2025).*

(Continued)

*Primary Examiner* — Syed A Zaidi

(57) ABSTRACT

Systems, methods, and non-transitory computer-readable media are provided for detecting and monitoring fraudulent entity networks in a networked environment. The networked environment can be mapped with cross account clustering to identify nodes associated with one or more entity networks in the networked environment and can identify whether the one or more entity networks are fraudulent entity networks based on a determination that one or more nodes in the one or more entity networks is a source of malignant content. Upon detecting the fraudulent entity networks, embodiments (Continued)

of the present disclosure can alert parties that may be affected by the one or more fraudulent entity networks and/or can initiate one or more actions against the fraudulent entity network.

18 Claims, 11 Drawing Sheets

(58) Field of Classification Search
USPC ........................................................ 726/23
See application file for complete search history.

(56) References Cited

U.S. PATENT DOCUMENTS

| | | | | |
|---|---|---|---|---|
| 11,074,362 | B2 * | 7/2021 | Conikee | G06F 21/577 |
| 11,334,692 | B2 * | 5/2022 | Farrell | G06N 5/02 |
| 11,610,588 | B1 * | 3/2023 | Grichnik | H04L 67/306 |
| 11,809,593 | B2 * | 11/2023 | Irish | G06F 16/2428 |
| 2013/0073473 | A1 * | 3/2013 | Heath | G06Q 30/0241 705/319 |
| 2016/0149936 | A1 * | 5/2016 | Pegna | H04L 67/535 726/23 |
| 2018/0091537 | A1 * | 3/2018 | Uggirala | G06F 16/951 |
| 2018/0316683 | A1 | 11/2018 | Larkina et al. | |
| 2019/0114649 | A1 | 4/2019 | Wang et al. | |
| 2019/0199519 | A1 * | 6/2019 | Goyal | H04L 9/0643 |
| 2019/0278855 | A1 | 9/2019 | Kallas et al. | |
| 2020/0004964 | A1 | 1/2020 | Soumenkov et al. | |
| 2020/0169565 | A1 | 5/2020 | Badawy et al. | |
| 2020/0394313 | A1 * | 12/2020 | Ionescu | G06F 21/577 |
| 2021/0058352 | A1 | 2/2021 | Fogu et al. | |
| 2021/0183479 | A1 * | 6/2021 | Lopez | G16H 80/00 |
| 2022/0210657 | A1 * | 6/2022 | Desai | H04W 12/66 |

FOREIGN PATENT DOCUMENTS

| | | | |
|---|---|---|---|
| CN | 110352427 | A | 10/2019 |
| JP | 2016530586 | A | 9/2016 |
| JP | 2018190370 | A | 11/2018 |
| WO | 2015006180 | A1 | 1/2015 |
| WO | 2016081516 | A2 | 5/2016 |
| WO | 2018125984 | A1 | 7/2018 |

OTHER PUBLICATIONS

International Search Report and Written Opinion mailed Nov. 8, 2022 for International Application No. PCT/US2022/035813, 11 pages.

Extended European Search Report dated Apr. 22, 2025, in connection with European Application No. 22834257.2, 10 pages.

Notice of Reasons for Refusal dated Jun. 24, 2025, in connection with Japanese Application No. 2023-580363, 11 pages.

First Office Action dated May 20, 2026, in connection with Chinese Application No. 202280047136.0, 25 pages.

* cited by examiner

700

730 732 734 736 738

Detect Review Enforce Report Cluster Browser

All URLs

0 Active Filters

Please press Enter to start search

0 Selected

720

| # Row N... | Title | Cluster Connections | URL | Domain | Hosting Status | Register | Registrant Name | First Detected |
|---|---|---|---|---|---|---|---|---|
| 1 | overlays not functioing... | (175) | https://forums.garmin.com... | garmin.com | Active | xxxxxxxxxxx | xxx xxxxxxxxxx | 4/20/2021 |
| 2 | White River National Fores... | (175) | xxxxxxxxxxx | xxxxxxxxxxx | Active | xxxxxxxxxxx | xxx xxxxxxxxxx | 4/20/2021 |
| 3 | What is recission? | (398) | xxxxxxxxxxx | xxxxxxxxxxx | Active | xxxxxxxxxxx | xxx xxxxxxxxxx | 4/20/2021 |
| 4 | The Congressional Globe... | (398) | xxxxxxxxxxx | xxxxxxxxxxx | Active | xxxxxxxxxxx | xxx xxxxxxxxxx | 4/20/2021 |
| 5 | Speakers\|The Channel Co... | (71) | xxxxxxxxxxx | xxxxxxxxxxx | Active | xxxxxxxxxxx | xxx xxxxxxxxxx | 4/20/2021 |
| 6 | Sitemap - Freeteknomusic... | (398) | xxxxxxxxxxx | xxxxxxxxxxx | Active | xxxxxxxxxxx | xxx xxxxxxxxxx | 4/20/2021 |
| 7 | Services - nuDESIGN LLC | (175) | xxxxxxxxxxx | xxxxxxxxxxx | Active | xxxxxxxxxxx | xxx xxxxxxxxxx | 4/20/2021 |
| 8 | PeaceLink - Disarmo | (146) | xxxxxxxxxxx | xxxxxxxxxxx | Active | xxxxxxxxxxx | xxx xxxxxxxxxx | 4/20/2021 |
| 9 | Muoproduction of J/psi (3... | (342) | xxxxxxxxxxx | xxxxxxxxxxx | Active | xxxxxxxxxxx | xxx xxxxxxxxxx | 4/20/2021 |
| 10 | Mohawk Council of Akwes... | (175) | xxxxxxxxxxx | xxxxxxxxxxx | Active | xxxxxxxxxxx | xxx xxxxxxxxxx | 4/20/2021 |
| 11 | Journal of the Senate of th... | (175) | xxxxxxxxxxx | xxxxxxxxxxx | Active | xxxxxxxxxxx | xxx xxxxxxxxxx | 4/20/2021 |
| 12 | Journal of the House of Re... | (83) | xxxxxxxxxxx | xxxxxxxxxxx | Active | xxxxxxxxxxx | xxx xxxxxxxxxx | 4/20/2021 |
| 13 | Event Agenda Page\| The C... | (193) | xxxxxxxxxxx | xxxxxxxxxxx | Active | xxxxxxxxxxx | xxx xxxxxxxxxx | 4/20/2021 |
| 14 | Constitutional Whig 5 Jan... | (75) | xxxxxxxxxxx | xxxxxxxxxxx | Active | xxxxxxxxxxx | xxx xxxxxxxxxx | 4/20/2021 |
| 15 | 45th Session (1990-1991)... | (121) | xxxxxxxxxxx | xxxxxxxxxxx | Active | xxxxxxxxxxx | xxx xxxxxxxxxx | 4/20/2021 |
| 16 | 2018 Gallatin City Guide b... | (24) | xxxxxxxxxxx | xxxxxxxxxxx | Active | xxxxxxxxxxx | xxx xxxxxxxxxx | 4/20/2021 |

Figure 8:
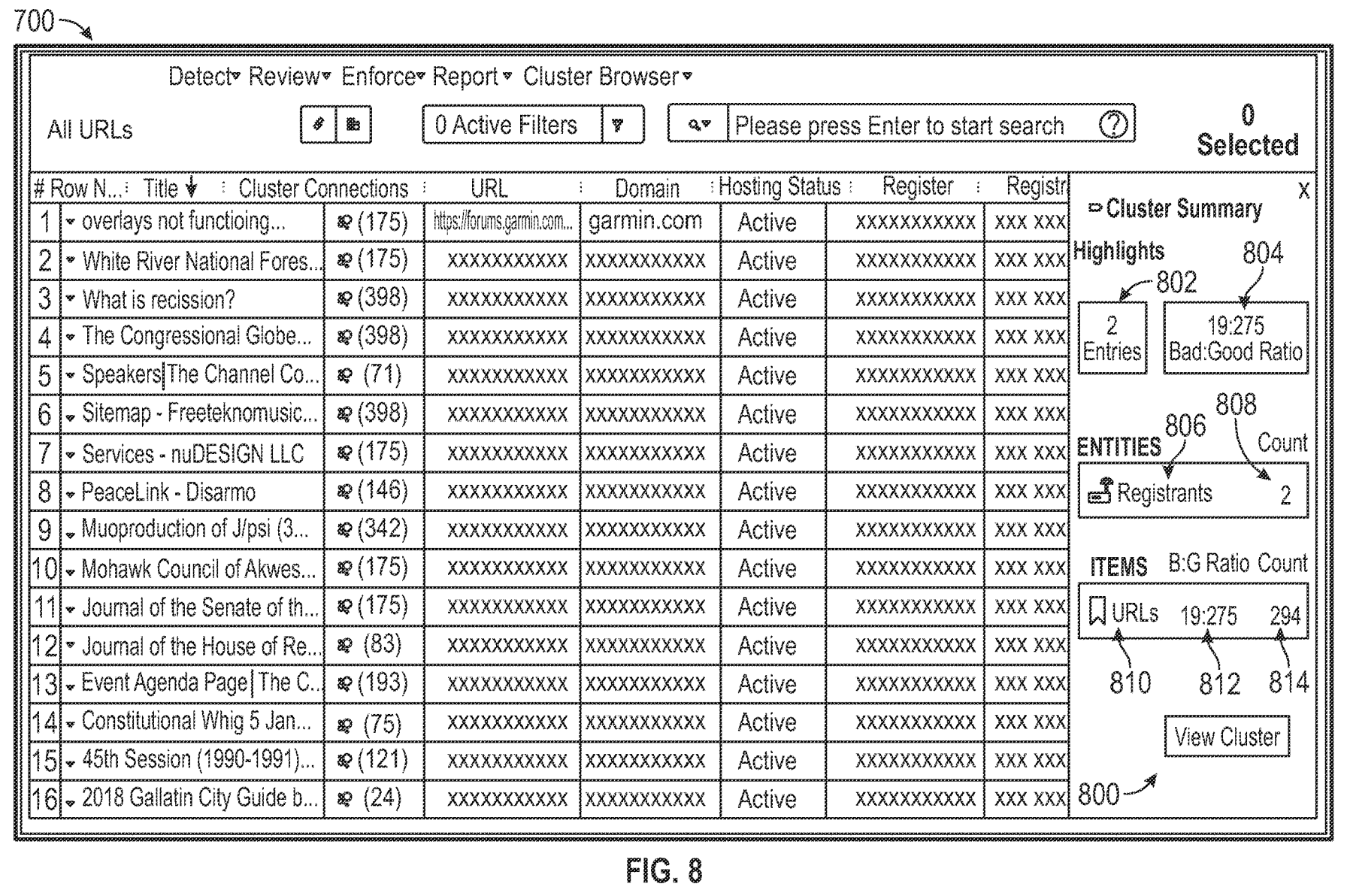

Detect Review Enforce Report Cluster Browser

All URLs

0 Active Filters

Please press Enter to start search

0 Selected

| # Row N... | Title | Cluster Connections | URL | Domain | Hosting Status | Register | Registr |
|---|---|---|---|---|---|---|---|
| 1 | overlays not functioing... | (175) | https://forums.garmin.com... | garmin.com | Active | xxxxxxxxxxx | xxx xxx |
| 2 | White River National Fores... | (175) | xxxxxxxxxxx | xxxxxxxxxxx | Active | xxxxxxxxxxx | xxx xxx |
| 3 | What is recission? | (398) | xxxxxxxxxxx | xxxxxxxxxxx | Active | xxxxxxxxxxx | xxx xxx |
| 4 | The Congressional Globe... | (398) | xxxxxxxxxxx | xxxxxxxxxxx | Active | xxxxxxxxxxx | xxx xxx |
| 5 | Speakers\|The Channel Co... | (71) | xxxxxxxxxxx | xxxxxxxxxxx | Active | xxxxxxxxxxx | xxx xxx |
| 6 | Sitemap - Freeteknomusic... | (398) | xxxxxxxxxxx | xxxxxxxxxxx | Active | xxxxxxxxxxx | xxx xxx |
| 7 | Services - nuDESIGN LLC | (175) | xxxxxxxxxxx | xxxxxxxxxxx | Active | xxxxxxxxxxx | xxx xxx |
| 8 | PeaceLink - Disarmo | (146) | xxxxxxxxxxx | xxxxxxxxxxx | Active | xxxxxxxxxxx | xxx xxx |
| 9 | Muoproduction of J/psi (3... | (342) | xxxxxxxxxxx | xxxxxxxxxxx | Active | xxxxxxxxxxx | xxx xxx |
| 10 | Mohawk Council of Akwes... | (175) | xxxxxxxxxxx | xxxxxxxxxxx | Active | xxxxxxxxxxx | xxx xxx |
| 11 | Journal of the Senate of th... | (175) | xxxxxxxxxxx | xxxxxxxxxxx | Active | xxxxxxxxxxx | xxx xxx |
| 12 | Journal of the House of Re... | (83) | xxxxxxxxxxx | xxxxxxxxxxx | Active | xxxxxxxxxxx | xxx xxx |
| 13 | Event Agenda Page\|The C... | (193) | xxxxxxxxxxx | xxxxxxxxxxx | Active | xxxxxxxxxxx | xxx xxx |
| 14 | Constitutional Whig 5 Jan... | (75) | xxxxxxxxxxx | xxxxxxxxxxx | Active | xxxxxxxxxxx | xxx xxx |
| 15 | 45th Session (1990-1991)... | (121) | xxxxxxxxxxx | xxxxxxxxxxx | Active | xxxxxxxxxxx | xxx xxx |
| 16 | 2018 Gallatin City Guide b... | (24) | xxxxxxxxxxx | xxxxxxxxxxx | Active | xxxxxxxxxxx | xxx xxx |

X

Cluster Summary

Highlights 802 804

2 Entries

19:275 Bad:Good Ratio

ENTITIES 806 808 Count

Registrants 2

ITEMS B:G Ratio Count

URLs 19:275 294

810 812 814

View Cluster

Detect▾ Review▾ Enforce▾ Report▾ Cluster Browser▾

All URLs | 0 Active Filters | Please press Enter to start search | 0 Selected

| # Row N... | Title | Cluster Connections | URL | Domain | Hosting Status | Register | Registrant Name | First Detected |
|---|---|---|---|---|---|---|---|---|
| 1 | overlays not functioing... | (398) | https://forums.garmin.com... | garmin.com | Active | xxxxxxxxxxx | xxx xxxxxxxxxx | 4/20/2021 |
| 2 | White River National Fores... | (398) | xxxxxxxxxxx | xxxxxxxxxxx | Active | xxxxxxxxxxx | xxx xxxxxxxxxx | 4/20/2021 |
| 3 | What is recission? | (398) | xxxxxxxxxxx | xxxxxxxxxxx | Active | xxxxxxxxxxx | xxx xxxxxxxxxx | 4/20/2021 |
| 4 | The Congressional Globe... | (398) | xxxxxxxxxxx | xxxxxxxxxxx | Active | xxxxxxxxxxx | xxx xxxxxxxxxx | 4/20/2021 |
| 5 | Speakers\|The Channel Co... | (398) | xxxxxxxxxxx | xxxxxxxxxxx | Active | xxxxxxxxxxx | xxx xxxxxxxxxx | 4/20/2021 |
| 6 | Sitemap - Freeteknomusic... | (398) | xxxxxxxxxxx | xxxxxxxxxxx | Active | xxxxxxxxxxx | xxx xxxxxxxxxx | 4/20/2021 |
| 7 | Services - nuDESIGN LLC | (398) | xxxxxxxxxxx | xxxxxxxxxxx | Active | xxxxxxxxxxx | xxx xxxxxxxxxx | 4/20/2021 |
| 8 | PeaceLink - Disarmo | (398) | xxxxxxxxxxx | xxxxxxxxxxx | Active | xxxxxxxxxxx | xxx xxxxxxxxxx | 4/20/2021 |
| 9 | Muoproduction of J/psi (3... | (398) | xxxxxxxxxxx | xxxxxxxxxxx | Active | xxxxxxxxxxx | xxx xxxxxxxxxx | 4/20/2021 |
| 10 | Mohawk Council of Akwes... | (398) | xxxxxxxxxxx | xxxxxxxxxxx | Active | xxxxxxxxxxx | xxx xxxxxxxxxx | 4/20/2021 |
| 11 | Journal of the Senate of th... | (398) | xxxxxxxxxxx | xxxxxxxxxxx | Active | xxxxxxxxxxx | xxx xxxxxxxxxx | 4/20/2021 |
| 12 | Journal of the House of Re... | (398) | xxxxxxxxxxx | xxxxxxxxxxx | Active | xxxxxxxxxxx | xxx xxxxxxxxxx | 4/20/2021 |
| 13 | Event Agenda Page\|The C... | (398) | xxxxxxxxxxx | xxxxxxxxxxx | Active | xxxxxxxxxxx | xxx xxxxxxxxxx | 4/20/2021 |
| 14 | Constitutional Whig 5 Jan... | (398) | xxxxxxxxxxx | xxxxxxxxxxx | Active | xxxxxxxxxxx | xxx xxxxxxxxxx | 4/20/2021 |
| 15 | 45th Session (1990-1991)... | (398) | xxxxxxxxxxx | xxxxxxxxxxx | Active | xxxxxxxxxxx | xxx xxxxxxxxxx | 4/20/2021 |
| 16 | 2018 Gallatin City Guide b... | (398) | xxxxxxxxxxx | xxxxxxxxxxx | Active | xxxxxxxxxxx | xxx xxxxxxxxxx | 4/20/2021 |

SYSTEMS AND METHODS FOR MAPPING A NETWORKED ENVIRONMENT WITH CROSS ACCOUNT CLUSTERING TO MONITORING AND/OR DETECT FRAUDULENT ENTITY NETWORKS

RELATED APPLICATIONS

This application is a 35 U.S.C § 371 national stage application for International Application No. PCT/US2022/035813, entitled "SYSTEMS AND METHODS FOR MAPPING A NETWORKED ENVIRONMENT WITH CROSS ACCOUNT CLUSTERING TO MONITORING AND/OR DETECT FRAUDULENT ENTITY NETWORKS", filed on Jun. 30, 2022, which claims the benefit of and priority to U.S. Provisional Application No. 63/216,878, filed on Jun. 30, 2021, which are incorporated by reference herein in their entireties.

BACKGROUND

An overwhelming amount of digital content is accessible over networked environments, such as the Internet. This content is spread across multiple data channels and/or sources, and more and more content is being made available daily. While most of this content is legitimate/benign, some of the content is malignant (e.g., fraudulent, counterfeit, infringing, or malicious).

Often identifying, tracking, and remedying malignant content on the Internet is a moving target given the fluidity with which digital content can be added or removed from one or more data channels or sources and the ability for perpetrators of malignant content to hide their identities and/or create aliases or subsidiaries. The dynamic nature of digital content on the Internet can also make it difficult to assess the scope of malignant content and/or a scope of the entities perpetuating the malignant content at any given time and/or across various data channels, making it challenging to adequately target and remediate the malignant content in a concerted, effective, and efficient manner.

SUMMARY

Embodiments of the present disclosure provide for detecting, monitoring, and/or removing fraudulent entity networks in a networked environment. The networked environment can be mapped with cross account clustering to identify nodes associated with one or more entity networks in the networked environment and can identify whether the one or more entity networks are fraudulent entity networks based on a determination that one or more nodes in the one or more entity networks is a source of malignant content (e.g., fraudulent, counterfeit, infringing, malicious content). Upon detecting the fraudulent entity networks, embodiments of the present disclosure can alert parties that may be affected by the one or more fraudulent entity networks and/or can initiate one or more actions against the fraudulent entity network.

Utilizing cross-account clustering in the network map/graph can create edges between nodes in the network graph by determining explicit and implicit connections or links between the database documents of different client accounts based on the data in the database for the client accounts; thereby generating a robust network map/graph of entity networks in the networked environment while maintaining confidential and/or private client information from other clients. Using this approach, seemingly unrelated and/or distinct entity networks detected by different client accounts can be determined to the same entity network; and/or entity networks that appear to be legitimate based on the database records associated with one client account can be determined to be part of one or more entity networks that have been determined to be fraudulent based on the database records of one or more other client accounts. Likewise, using this approach, embodiments of the present disclosure can determine that certain fraudulent entity networks are targeting certain industries, products, and/or types of brands and can use this to alert client accounts that the fraudulent entity network exists even if it is currently determined that the client accounts have not been a target of the fraudulent entity network.

Embodiments of the present disclosure can address the challenges associated with identifying, tracking, and remedying malignant content on the Internet, where digital content is added or removed from one or more data channels or sources and where the perpetrators of malignant content to hide their identities and/or create aliases or subsidiaries. Embodiments of the present disclosure can also allow clients to readily assess the scope of malignant content and/or a scope of the entities perpetuating the malignant content at any given time and/or across various data channels to enable targeting and remediation of malignant content in a concerted, effective, and efficient manner.

In accordance with embodiments of the present disclosure, systems, methods, and non-transitory computer-readable media for detecting and monitoring fraudulent entity networks in a networked environment is provided. The system includes a computing system communicatively coupled to data sources in a networked environment, the data sources including one or more servers that are configured to host digital content, and one or more processors being disposed in the computing system. The non-transitory computer-readable medium stores instructions to be executed by the one or more processors to perform the method. The one or more processors are be programmed to establish separate and distinct client accounts, and search, for each client account, the content hosted by the one or more remote servers in the networked environment to generate separate harvested data sets for each client account. The one or more processors are further programmed to tag each search result in the harvested data sets as legitimate or malignant based on an analysis of each search result and generate a network graph by combining data from each search result in the harvested data sets for the client accounts. The one or more processors are further programmed to generate clusters in the network graph, the clusters including cross-account clusters that include data from two or more client accounts, identify one or more fraudulent entity networks based on the clusters in the network graph, and initiate a removal action against the identified one or more fraudulent entity networks.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

FIG. 7 depicts a graphical user interface illustrating a list of documents in a graph database and their respective keys for a client account in accordance with embodiments of the present disclosure.

FIG. 8 depicts the graphical user interface of FIG. 7 with an area illustrating a cluster summary in accordance with embodiments of the present disclosure.

FIG. 10 is a graphical user interface that illustrates a grid view in accordance with embodiments of the present disclosure.

DETAILED DESCRIPTION

Figure 1:
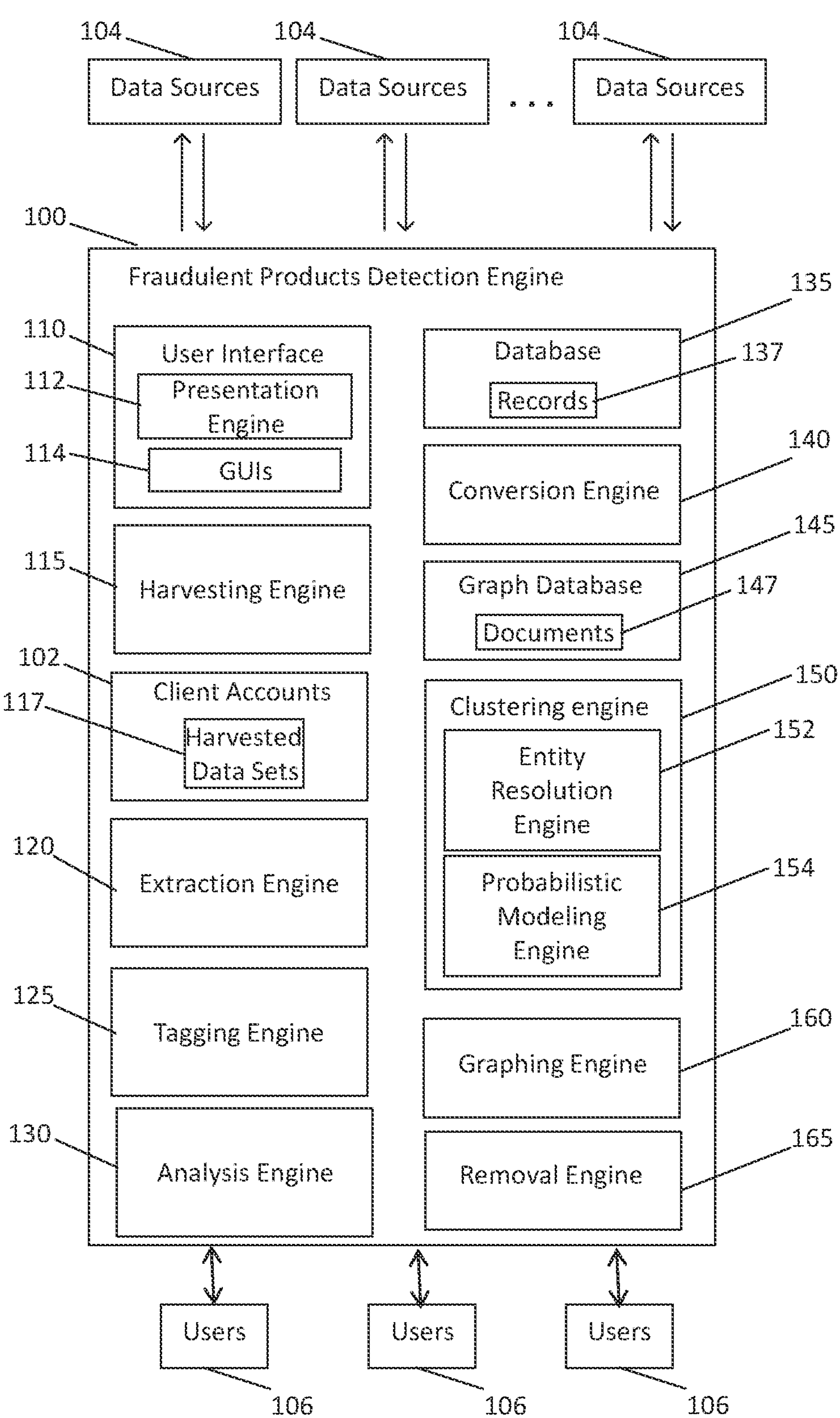
FIG. 1 is a block diagram of an exemplary fraudulent content monitoring and detection engine in accordance with embodiments of the present disclosure.

Embodiments of the present disclosure relate to systems, methods, and non-transitory computer-readable media for detecting, monitoring, and/or removing fraudulent entity networks in a networked environment. The networked environment can be mapped with cross account clustering to identify nodes associated with one or more entity networks in the networked environment, and embodiments of the present disclosure can detect whether the one or more entity networks are fraudulent entity networks based on a determination that one or more nodes in the one or more entity networks is the source of malignant content (e.g., fraudulent, counterfeit, infringing, malicious content). Upon detecting the fraudulent entity networks, embodiments of the present disclosure can alert parties that may be affected by the one or more fraudulent entity networks and/or can initiate one or more actions against the fraudulent entity network.

In a non-limiting example application, embodiments of the present disclosure can be implemented for brand protection in networked environments. Embodiments of the present disclosure provide the ability to harvest digital content (e.g., webpages) from data sources in a networked environment, e.g., where one or more harvesting engines search for digital content in the data sources based on searches (e.g., using keywords, uniform resource locators, etc.), and an extraction engine extracts attributes from the digital content. In response to detecting malignant content in the harvested digital content, embodiments of the present disclosure can create one or more tags, which can be used for defining the type of malignant content that was detected (e.g., fraudulent, counterfeit, infringing, malicious content). As an example, malignant content can include a webpage offering to sell products that are counterfeit or includes infringing, fraudulent, or malicious items.

Separate client accounts can be created for each client utilizing exemplary embodiments of the present disclosure (e.g., for brand protection) so that the searches used to harvest digital content, the results of the harvesting, and the tagging of the results are specific to the client account and are generally not shared between client accounts to maintain confidentiality and privacy for the clients. The results of the harvesting for each client account can be stored as separate records in a database, where the content and information extracted from the results can form the data fields of the records. Additionally, a client identifier can be added to each record in the database to associate the record with the corresponding client for which the record was generated, an industry identifier can be added, and/or a product category identifier can be added. The client identifier can be unique to the client, while the industry identifier and product category identifier can be shared by client accounts in the same industry or that sell products from the same category. In some embodiments, a client may be in several industries and/or may sell products in several product categories. In such embodiments, the client account can be associated with industry identifiers corresponding to each industry associated with the client account and/or can be associated with product category identifiers corresponding to each product category associated with the client account. The tags generated for each result/record can also be added to each record as a data field to the database.

Using the harvested digital content and the tags from the database records for the client accounts, embodiments of the present disclosure can be configured to create a cumulative or aggregate network map or graph by combining the harvested digital content and tags from the client accounts to identify fraudulent entity networks and assess the scope and nature of the malignant content across multiple data channels, industries, and brands. Embodiments of the present disclosure can utilize cross-account clustering in the network map/graph to create edges between nodes in the network graph by determining explicit and implicit connections or links between the records of different client accounts based on the data in the data fields of the records in the client accounts; thereby generating a robust network map/graph of entity networks in the networked environment. Using this approach, seemingly unrelated and/or distinct entity networks detected by different client accounts can be determined to be the same entity network and/or entity networks that appear to be legitimate based on the database records associated with one client account can be determined to be part of one or more entity networks that have been determined to be fraudulent based on the database records of one or more other client accounts. Likewise, using this approach, embodiments of the present disclosure can determine that certain fraudulent entity networks are targeting certain industries, products, and/or types of brands and can use this to alert client accounts that the fraudulent entity network exists even if it is currently determined that the client accounts have not been a target of the fraudulent entity network.

In utilizing cross-account clustering, there is potential that the confidential and private information associated with one account may be disclosed to another account via the network map/graph. To prevent the disclosure of confidential and/or private information between client accounts, embodiments of the present disclosure can anonymize and/or obfuscate information in the network map/graph and/or nodes and/or edges of the graph can be omitted or modified to preserve the confidential or private client information.

The generation of the network map/graph using cross-account clustering to identify fraudulent entity networks can facilitate targeted and broad remediation actions to take down the fraudulent entity networks on a larger scale than what has typically been possible. Thus, rather than having to target individual websites and/or e-commerce platforms, embodiments of the present disclosure can facilitate concerted action against an entire (or large portion) of a fraudulent entity network and/or may be utilized as evidence in legal proceedings.

FIG. 1 is a block diagram of an exemplary fraudulent entity network detection and/or monitoring engine 100 in accordance with embodiments of the present disclosure. The engine 100 can allow users to establish client accounts 102 where data associated with each client account can be confidential and/or private data that is typically not shared with other client accounts 102. In an example application, the engine 100 is implemented for brand protection in networked environments, where the client accounts 102 can be associated with organizations or business trying to detect, monitor, and remove malignant content associated with their products, trademarks, and/or brands from the Internet. The engine 100 can include a user interface 110, a harvesting engine 115, an extraction engine 120, a tagging engine 125, an analysis engine 130, database conversion engine 140, a clustering engine 150 that includes an entity resolution engine 152 and a probabilistic modeling engine 154, a network graphing engine 155, and a removal engine 160.

The engine 100 harvests, extracts, and analyzes digital content (harvested data sets 117) from disparate data sources 104 associated with nodes in a networked environment on an account-by-account basis, where data sources 104 and/or harvested data sets 117 from the disparate sources 104 can be different for different client accounts 102 (e.g., different client accounts 102 can have different search criteria). As one example, a first account can utilize the engine 100 to harvest, extract, and analyze a first set of content and information (e.g., a first harvested data set) from a first set of data sources 104 and a second account can utilize the engine 100 to harvest, extract, and analyze a second set of content and information (e.g., a second set of harvested data sets) from a second set of data sources 104, where the first and second harvested data sets may have common elements (e.g., may include some of the same results) or may be mutually exclusive (e.g., there are no common results). The engine 100 also receive additional data that supplements the data extracted from the harvested digital content. As an example, users of the client accounts can input data (e.g., seller information, domain, contacts, seller Tracking) to be included in the harvested data sets 117. As another example, additional data (e.g., seller information) from online marketplaces can be received and included in the harvested data sets 117. The engine 100 generates a network graph for the networked environment by combining the data extracted from the results in the harvested data sets (e.g., the first and second harvested data sets) associated with the different client accounts 102. The network graph is used to identify and detect one or more fraudulent entity networks in the networked environment, to associate the one or more fraudulent entity networks with one or more of the client accounts 102, and/or to determine the scope and aliases of the entities of the fraudulent entity networks in the networked environment.

The disparate data sources 104 can be associated with various data channels on the Internet or in any other networked environment. For example, the disparate sources 104 can include servers and/or databases hosting Internet/digital content, such as websites, social media, e-commerce and online marketplaces, dark web, databases for identifying Internet resource information (e.g., registrant names, registrar names, physical addresses, phone numbers, e-mail addresses, seller names, owners of a domain name, IP address blocks, etc.).

In an embodiment, the harvesting engine 115 is configured to search online content for malignant content by crawling the web and/or the dark web, harvesting search engines and/or APIs to search webpages, searching mobile application data, and/or searching any other content in a networked environment. The harvesting engine 115 searches the content and information from one or more of the disparate data sources 104 in the networked environment based on item identifiers, keyword strings or a combination thereof that are specified for each client account.

The harvesting engine 115 generates or build one or more queries (e.g., database, API, or web-based queries) based on the one or more search terms (e.g., key words) input by one or more users 106 of one or more client accounts 102 via the one or more graphical user interfaces 114 of the user interface 110. As one example, harvesting engine 115 builds several queries from a single set of search terms, where each query can be specific to a search engine and/or application programming interface (API).

The harvesting engine 115 is executed to facilitate parallel searching of various data sources 104 for like content. The queries are generated or built using one or more query languages, such as Structured Query Language (SQL), Contextual Query Language (CQL), proprietary query languages, domain specific query languages and/or any other suitable query languages. In some embodiments, harvesting engine 115 can generate or build one or more queries using one or more programming languages or scripts, such as Java, C, C++, Perl, Ruby, and the like.

The harvesting engine 115 executes each query, for each client account, with search engines and/or APIs, which can return Internet content and/or any other content in a networked environment. As one example, execution of the harvesting engine 115 can return one or more webpages from one or more Internet domains hosted by one or more web servers at one or more data sources that are returned in response to a query using the search terms.

In the exemplary embodiment, the results returned via harvesting engine 115 are fetched and downloaded into a storage device and stored as harvested data sets 117. For example, each result (e.g., each webpage) can be stored as a file or other data structure. In some instances, one or more of the results can be stored in the same format as it is on the data source from which it is retrieved. For example, web pages may be stored in their native text-based mark-up languages (e.g., HTML and XHTML). In some instances, one or more of the results can be stored in a different format than the format in which it is stored on the data source from which it is retrieved. In exemplary embodiments, over time, the harvesting engine 115 can return more than hundreds of millions of unique results (greater than 100,000,000 results). A frequency with which the harvesting engine 115 harvests content and information can be specified on an account-by-account basis, such that for any given client account, the harvest engine 115 can harvest content and information from the data sources 104 in the networked environment every hour, day, week, month, quarter, year, and so on, and/or the harvest engine 115 can harvest the content and information on demand (e.g., in response to a request from a user of a client account. The queries and search terms utilized by the harvest engine 115 can be updated and/or modified, for example, based on analysis of the results from a previous harvesting operation and/or based on detection and mapping of fraudulent entity networks.

The extraction engine 120 extracts content and information from each result (e.g., each webpage and associated metadata) in harvested data sets 117. In an exemplary embodiment, the content and information extracted from the results can include product information (e.g., brand names, company names, logos, product descriptions, product images, product prices, GTINs, SKUs, UPC, EAN, etc.), seller or user information (e.g., seller/user names, physical addresses, phone numbers, e-mail addresses, domain names, uniform resource locators etc.), social media profile information (e.g., including product information and/or seller information), website information (e.g., information, such as images and/or text included in the body of the webpage and/or information included in the source code for the webpage), network information (e.g., registrant names, registrar names, domain names, Internet Protocol addresses, owner information for Internet Resources, Uniform Resource Locators, Uniform Resource Identifiers, etc.), and the like. The content and information extracted from the results for each client account can be used to determine whether each record corresponds to legitimate or malignant content.

As the extraction engine 120 extracts the content and information from each result for each account, the extraction engine 120 builds and/or updates a database 135 with the content and information from the results. The database 135 can be a relational database. The extraction engine 120 creates records 137 in the database 135 for each result in the harvested data sets 117 and for each client account 102, and stores the content and information extracted from each result as data in data fields in their respective records 137. As an example, each unique result is stored as a record (defined as a row in the database 135), where the extracted content and information for each record can be stored in the data fields or columns of each record. In addition to the data fields for storing data extracted from the results, the records 137 in the database 135 can include additional data fields based on the client account to which the records 137 are associated and/or based on an analysis of the results corresponding to the records 137.

Examples of data fields or columns that can be included in the records 137 can include, for example, data fields for product names, product descriptions, seller names, GTINs, SKUs, UPCs, EANs, marketplace-specific identifiers (e.g., an Amazon Standard Identification Number), geographic location of sellers, geographic locations to which sellers ship products, seller reviews, titles of the result (e.g., a title of the webpage), prices of products, quantities of products available for purchase, product dimensions, images, product images, logos and/or artwork, videos, audio, registrant names of the domain for webpages, domain name servers that hosts result; registrar names through the result is registered, IP addresses for the domains, domain names, tags indicating whether the record is associated legitimate or malignant content, client account identifiers (to identify to which client account the record belongs), an industry identifier (to identify an industry of the client), one or more product type identifiers (to identify type of products the client sells and/or a type of products being offered by the result corresponding to the record), HTML page source code, XML files, JavaScripts, and the like.

To extract the content and information from the results in harvested data sets 117, extraction engine 120 uses, for example, natural language processing, machine learning, similarity measures, image matching techniques including pixel matching, and/or pattern matching techniques to identify item identifiers in the results. Extraction engine 120 utilizes one or more ontologies of entities to derive and/or identify entities (e.g., seller names, Internet resource owners) included in the results. Various algorithms and/or techniques can be utilized by extraction engine 120. For example, algorithms for fuzzy text pattern matching, such as Baeza-Yates-Gonnet can be used for single strings and fuzzy Aho-Corasick can be used for multiple string matching; algorithms for supervised or unsupervised document classification techniques can be employed after transforming the text into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

In an alternative embodiment, rather than downloading results by the harvesting engine 115 to create harvested data sets 117, the harvesting engine 115 identifies a result (e.g., a webpage) and extraction engine 120 parses the content and information from the data source associated with the result. Extraction engine 120 creates the database 135 using the content and information as described above.

The tagging engine 125 is executed to tag the harvested data sets 117, e.g., via the database 135. For example, the tagging engine 125 is executed to add a tag to a field of each record in the database 135 to identify the records 137, and therefore, the digital content in the results (e.g., webpages) in the harvested data sets 117 associated with the records 137, as being benign or malignant (e.g., fraudulent, infringing, counterfeit, malicious). The users 106 can interact with the tagging engine 125 via the user interfaces 110 to allow the user 106 to specify tags for the records 137 in the database 135. In some embodiments, the tagging engine 125 is configured to automatically tag the records 137 of the attribute database 135. For example, the tagging engine 125 is configured to utilize one or more machine learning algorithms to specify tags for the records 137 in the database 135, where the machine learning algorithm can be trained using a corpus of training data. The harvested data sets 117 are tagged before, during, or after the harvested data sets 117 are harvested by the one or more harvesting engines 115.

The database conversion engine 140 is executed to transform, format, and load the data from the database 135 into a database 145. In exemplary embodiments, the database 145 is a graph database that utilizes a graph data model and/or is a multi-model database that utilizes one or more data models (e.g., graph data model, document data model, key-value model), although other types of databases and other types of data models can be utilized in accordance with embodiments of the present disclosure. In embodiments, the records 137 from the database 135 are converted to documents 147 in the database 145, which can be stored as, for example, JavaScript Object Notation (JSON) documents, although the documents 147 can be stored using other data structures, such as extensible Mark-up Language (XML) documents. The data conversion engine 140 transforms the data fields or columns of the records 137 in the database 135 into keys in the documents 147 in the database 145 and modifies the data, such as telephone numbers, emails, and addresses, to represent the data in their canonical form. The database conversion engine 140 convert some of the data in the data fields using one or more hash functions/algorithms so that the data are suitable for use as keys in the database 145. As a non-limiting, example, some of the data is converted using an MD5 hash function. Even with MD5 hashing, the data can be cleaned up, either directly on the data or during the transformation, in order to achieve alignment, to reduce the effort of alignment (entity resolution) after transformation as an analysis step.

An inverted search index is used by the engine 100 to evaluate documents 147 in the database 145 and keep statistics of documents 147 in the database 145 that have been tagged as malignant and actions that have been taken on the entities responsible for the malignant content associated with the documents 147 in the database 145 that have been tagged as being malignant.

While an embodiment of the engine 100 creates the database 145 based on the records 137 stored in the database 135, embodiments of the engine 100 can create the database 145 from the results harvested from the data sources 104 by the harvesting engine 115 such that the databases 135 and 145 can be created and updated in parallel based on the results from the harvesting engine 115 and/or the database 145 can be created and updated independently of, or in the alternative of, the database 135. The engine 100 periodically updates the database 145 based on updates to the records 137 in the database 135 and/or after the database 145 is initially created using the database 135, the engine 100 updates the data in the database 145 based on extraction of content and information from results generated by the harvesting engine 115.

Collections of documents 147 in the database 145 can be defined for vertices/nodes and edges of the graph data model. As a non-limiting example, node collections are defined for entity/seller names (and other personal identifiable information), domains, domain name servers, domain registrant information, IP addresses, URLs, and URIs, and edge collections of documents 147 are defined for physical addresses, phone numbers, e-mail addresses, domains, domain name servers, domain registrant information, IP addresses, URLs, and URIs, product descriptions, product listings on websites, and the like. The edge collections define relationships between node collections and include "to" and "from" keys that can be used to define an explicit relationship forming an edge between two or more nodes.

A non-limiting example of a node/vertex collection for a seller node can be represented as follows:

```
FOR seller IN sellerRaw
   LET key = seller._key //MD5(CONCAT(seller.siteGroup,seller.accountID))
   UPSERT {_key : key}
   INSERT {_key : key, accountID : seller.accountID, name : seller.sellerName,
listingsCount: seller.listingsCount, enforcedCount : seller.enforcedCount,
compliedCount: seller.compliedCount, needsReviewCount: seller.needsReviewCount,
benignCount : seller.benignCount, updatedDate : seller.updatedDate, firstSeen:
seller.firstSeen, lastSeen: seller.lastSeen, lastEnforcedTag: seller.lastEnforcedTag,
sellerHref: seller.sellerHref, hasSellerTracking: seller.hasSellerTracking,
lastAggUpdateTime:seller.lastAggUpdateTime, clusterId : seller.clusterId}
UPDATE { } INTO seller
```

Another non-limiting example of a node/vertex collection for a domain name server node can be represented as follows:

```
LET vector =
   UNIQUE(FLATTEN(FOR domain IN @@sourceCollection
   FILTER domain[@sourceProperty]!=null
   RETURN   (REGEX_SPLIT(domain[ @sourceProperty], ",")) , 2) )
FOR elt IN vector
   LET key = MD5(elt)
   UPSERT {_key : key}
   INSERT {_key : key, name : elt}
UPDATE { } INTO @@targetCollection
```

A non-limiting example of an edge collection for a domain name server edge can be represented as follows:

```
FOR doc IN @@sourceCollection
   FILTER doc[@fromProperty]!=null AND doc[@toProperty] !=null
   LET from = CONCAT(@fromCollection, "/", MD5(doc[@fromProperty]))
   LET nameservers = REGEX_SPLIT(doc[@toProperty], ",")
   FOR ns IN nameservers
      LET to = CONCAT(@toCollection, "/", MD5(ns))
      LET key =MD5(CONCAT(doc[@fromProperty],"-",@toProperty,"-", ns))
      UPSERT {_key : key}
      INSERT {_key : key, _from : from, _to : to}
      UPDATE { } INTO @@targetCollection
```

Since properties that refer to names, physical addresses, phone numbers, e-mail addresses, IP addresses in the seller and domain raw data can follow a pattern, one parametric query for creating vertices from these properties and one query for creating edges from these properties are used. The following are non-limiting examples of parametric queries for creating vertices and edges from source data properties.

```
targetDoc = {   _key : sourceDoc.sourceProperty',
                name : sourceDoc.sourceProperty}
targetEdge = { _key : fromCollection/sourceDoc.fromProp-edgeCollection-
toCollection/sourceDoc.toProp,
             _from : fromCollection/sourceDoc.fromProp,
             _to : toCollection/sourceDoc.toProp }
```

The clustering engine 150 includes the entity resolution engine 152 and the probabilistic modeling engine 154 to detect and identify one or more clusters or subgraphs corresponding to entity networks in a network graph using the database 145. As a non-limiting example, the entity resolution engine 152 utilizes one or more entity resolution algorithms to identify clusters/subgraphs. Users can specify the scope over which entity resolution can occur. For example, the user chooses to initiate entity resolution for the entire database or based on an arbitrary vertex/node associated with a particular seller name. The one or more entity resolution algorithms implemented via the entity resolution engine 152 include distributed iterative graph processing or Pregel algorithms. As a non-limiting example, the entity resolution engine 152 executes a connected components algorithm to detect and identify clusters/subgraphs corresponding to entity networks in the network graph. The connected components algorithm is used to identify connected groups of seller accounts in a seller graph. Seller accounts representing the same entity are connected via identifying information like phone numbers, e-mail addresses, and physical addresses. The connected components algorithm can find groups connected based on these keys. When the Pregel connected components algorithm is executed by the entity resolution engine 152, a property is added to vertices in connected components subgraphs. The property can then be interrogated via a query language to, for example, find the largest connected component graphs (cluster/subgraph corresponding to an entity network), which, for example, can be the groups containing the largest number of aliases for an entity likely being used to obfuscate behavior to avoid detection.

The probabilistic modeling engine 154 of the clustering engine 100 identifies probabilistic connections between nodes based similarities between parameters (values of keys) associated with the nodes. For example, multiple seller accounts from the same entity can be linked via common relationships and/or inferred relationships, and these relationships can form separate subgraphs, which can be used to identify the clusters/subgraphs containing related seller accounts. Inferred relationships are added to the graph data model. The probabilistic modeling engine 154 uses probabilities and/or similarity measures, such as one or more machine-learning-based probability measures can be assigned to the probabilistic connections. The probabilistic modeling engine 154 maintains probabilistic connections (and associated edges) that are equal to or exceed a specified threshold and eliminates probabilistic connections (and associated edges) that are less than a specified threshold. As a non-limiting example, one example of a machine-learning-based probability measure that is utilized by the probabilistic modeling engine 154 is Levenshtein distances.

The clustering engine 150 creates clusters/subgraphs corresponding to entity networks that are contained within a single client account and/or creates clusters/subgraphs corresponding to entity networks that include multiple client accounts (cross-account clusters) based on outputs of the entity resolution engine 152 and the probabilistic modeling engine 154. By evaluating the graph across client accounts, the cluster engine 150 identifies connections between nodes that otherwise would not have been identified; thereby expanding the size and scope of entity networks, providing users of the client accounts with a more robust and accurate view of fraudulent entity networks in the network environment, and facilitating a single cluster-based removal action targeting the fraudulent entity network and the aliases detected therein. When a cross-account cluster is generated in the network graph, the engine 100 can automatically alert one or more users associated with the client accounts that the scope of the fraudulent entity network has expanded. Each node in the graph can be associated with a client account identifier and each node in a cluster/subgraph in the graph can include a cluster identifier. The engine 100 determines that a cross-account cluster has been generated based on the existence of more than one client account identifier being present in a given cluster/subgraph.

The cross-account clustering performed by the clustering engine 150 can potentially expose the confidential and private information from other client accounts to users of the client account viewing the network map/graph. To prevent the disclosure of confidential and/or private information between client accounts, the engine 100 anonymizes and/or obfuscates information in the network map/graph, and/or nodes and/or edges of the graph are omitted or modified to preserve the confidential or private client information while still providing the benefit of the cross-account clustering. For example, nodes representing seller names or other personally identifiable information, e.g., a phone number or an email, related to a seller who is active on another client's account, can be displayed as corresponding icons with a distinct color, e.g., greyed-out, and without any text labels providing actual personally identifiable information.

The network graphs include an overwhelming number of nodes. The engine 100 reduces the scope of the graph and/or clusters/subgraphs in response to receiving a selection or request from the user. As an example, the scope of the network graph or clusters/subgraphs can be specified so that only nodes that have been tagged as being associated with malignant content can be included in the graph. As another example, the scope of the network graph or clusters/subgraphs can be limited by a geographic location or region (e.g., the United States, Norther America, the norther hemisphere, etc.) based on physical address data, IP addresses, phone numbers, etc. As another example, the scope of the graph can be limited by industry or product type such that the graph only includes nodes associated with a specific industry or product category.

The graphing engine 155 utilizes the graph data model to generate a graphical map of the documents 147 in the database 145 based on the node collections and the edge collections and/or edges that are explicitly and/or implicitly defined by the engine 100. The graphical map identifies subgraphs corresponding to clusters that represent entity networks. The nodes/vertices and edges in the graphical map provide a visualization of the network that allows users to trace and detect relationships between content and information from the data sources in the networked environment. The nodes can be rendered to include icons or other graphical indicia to indicate a type of node. For example, different types of nodes, such as entity name, domain name, domain name server, and the like can each be represented by different icons in the graphical map.

The removal engine 160 initiates an automated takedown of detected fraudulent content and/or products. Once a record in the database is tagged or determined as fraudulent, removal engine 160 can initiate a takedown request of the fraudulent content. For example, removal engine 160 can generate a Digital Millennium Copyright Act (DMCA) notice by retrieving data from the harvested data sets 117, the database 135, and/or the database 145 to generate a structured file or e-mail. After the notice is generated, the removal engine 160 can transmit the notice to a content host or owner. In another example, removal engine 160 communicates a takedown notice to the content host or owner via an API.

In an exemplary embodiments, the user interface 110 generates one or more graphical user interfaces (GUIs) 114 to include a list of the records or documents from the searches, e.g., using views of the database 135 and/or the database 145, where the records or documents are grouped in the one or more graphical user interfaces 114 based on one or more of the identifiers included in the records of the database 135 or documents of the database 145. As one non-limiting example, documents associated with the database 145 that have been tagged as malignant content and/or network graphs associated with the documents can be shown in graphical user interfaces 114. As another non-limiting example, records associated with the database 135 that have been tagged as malignant content can be shown in graphical user interfaces 114.

The user interface 110 includes a presentation/visualization engine 112 and one or more graphical user interfaces 114. Presentation engine 112 is configured to provide an interface between one or more services and/or engines implemented in engine 100. Upon receipt of data, presentation engine 112 is executed to generate the one or more of graphical user interfaces 114 and to render the data in the one or more graphical user interfaces 114. The one or more graphical user interfaces 114 allow users 106 to interact with engine 100 and include data output areas to display information to users 106 as well as data entry fields to receive information from users 106. Some examples of data output areas can include, but are not limited to text, graphics (e.g., graphs, maps-geographic or otherwise, images, and the like), and/or any other suitable data output areas. Some examples of data entry fields can include, but are not limited to text boxes, check boxes, buttons, dropdown menus, and/or any other suitable data entry fields.

The user interface 110 are generated by embodiments of engine 100 being executed by one or more servers and/or one or more user computing devices. The user interfaces 110 is configured to render the data corresponding to content and information extracted from data sources (e.g., Internet content) as described herein. The user interface 110 provides an interface through which users 106 can interact with the content, information, and identifiers stored in the database 135 and/or the database 145. For example, user interfaces 110 can be configured to provide a structured arrangement of the content and information extracted from a webpage collected via harvesting engine 115 and extraction engine 120.

As a non-limiting example, user interfaces 110 can provide a list or table including the data from the database 135 and/or database 145. As one non-limiting example, user interfaces 110 may include a list of entries for webpages collected via harvesting engine 115. For example, the rows can be associated with records in the database 135 and/or documents in the database 145 corresponding to webpages. As another non-limiting example, the user interface can render an interactive network graph with subgraph clusters identifying entity networks across client accounts 102.

The rows and/or values in the rows are selectable by user 106 to allow user 106 to interact with the list to modify the item identifiers and/or to perform one or more other actions. For example, if extraction engine 120 is unable to parse one or more item identifiers from a result, an analyst may review the result and enter one or more item identifiers into the row. The entered item identifier can then be used by the tagging engine 125 and analysis engine 130 in determining whether the content is legitimate or malignant.

As described herein, the engine 100 further includes a re-harvesting frequency option to enable user 106 of an account to specify the frequency with which harvesting engine 115 re-queries the data sources in the networked environment. For example, user 106 can specify that harvesting engine 115 searches every hour, every day, every week, every month, quarterly, and like.

Figure 2:
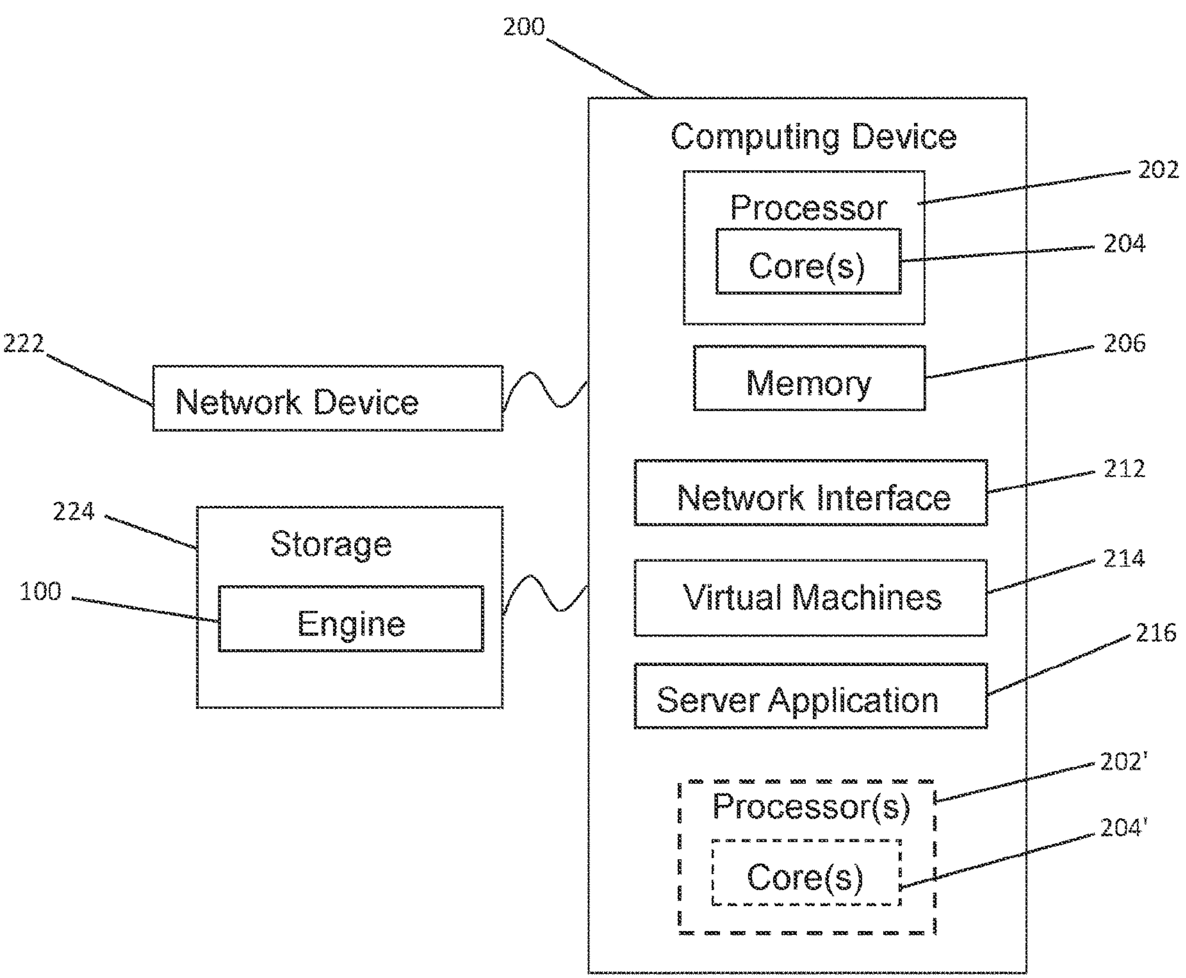
FIG. 2 is a block diagram of an exemplary computing device in accordance with embodiments of the present disclosure.

FIG. 2 is a block diagram of an exemplary computing device in accordance with embodiments of the present disclosure. In the present embodiment, computing device 200 is configured as a server that is programmed and/or configured to execute one of more of the operations and/or functions of engine 100 and to facilitate detection fraudulent entity networks and removal of malignant content on the Internet or other networked environments. Computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in computing device 200 may store computer-readable and computer-executable instructions or software for implementing exemplary embodiments of engine 100 or portions thereof.

Computing device 200 also includes configurable and/or programmable processor 202 and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in computing device 200 so that infrastructure and resources in the computing device may be shared dynamically. One or more virtual machines 214 may be provided to handle a process running on multiple processors so that the process appears to be using only one computing resource rather than multiple computing resources, and/or to allocate computing resources to perform functions and operations associated with engine 100. Multiple virtual machines may also be used with one processor or can be distributed across several processors.

Memory 206 may include a computer system memory or random access memory, such as DRAM, SRAM, EDO RAM, and the like. Memory 206 may include other types of memory as well, or combinations thereof.

Computing device 200 may also include one or more storage devices 224, such as a hard-drive, CD-ROM, mass storage flash drive, or other computer readable media, for storing data and computer-readable instructions and/or software that can be executed by the processing device 202 to implement exemplary embodiments of engine 100 described herein.

Computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11. T1, T3, 56kb, X.25), broadband connections (for example, ISDN, Frame Relay, ATM), wireless connections (including via cellular base stations), controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing computing device 200 to any type of network capable of communication and performing the operations described herein. While computing device 200 depicted in FIG. 2 is implemented as a server, exemplary embodiments of computing device 200 can be any computer system, such as a workstation, desktop computer or other form of computing or telecommunications device that is capable of communication with other devices either by wireless communication or wired communication and that has sufficient processor power and memory capacity to perform the operations described herein.

Computing device 200 may run any server application 216, such as any of the versions of server applications including any Unix-based server applications, Linux-based server application, any proprietary server applications, or any other server applications capable of running on computing device 200 and performing the operations described herein. An example of a server application that can run on the computing device includes the Apache server application.

Figure 3:
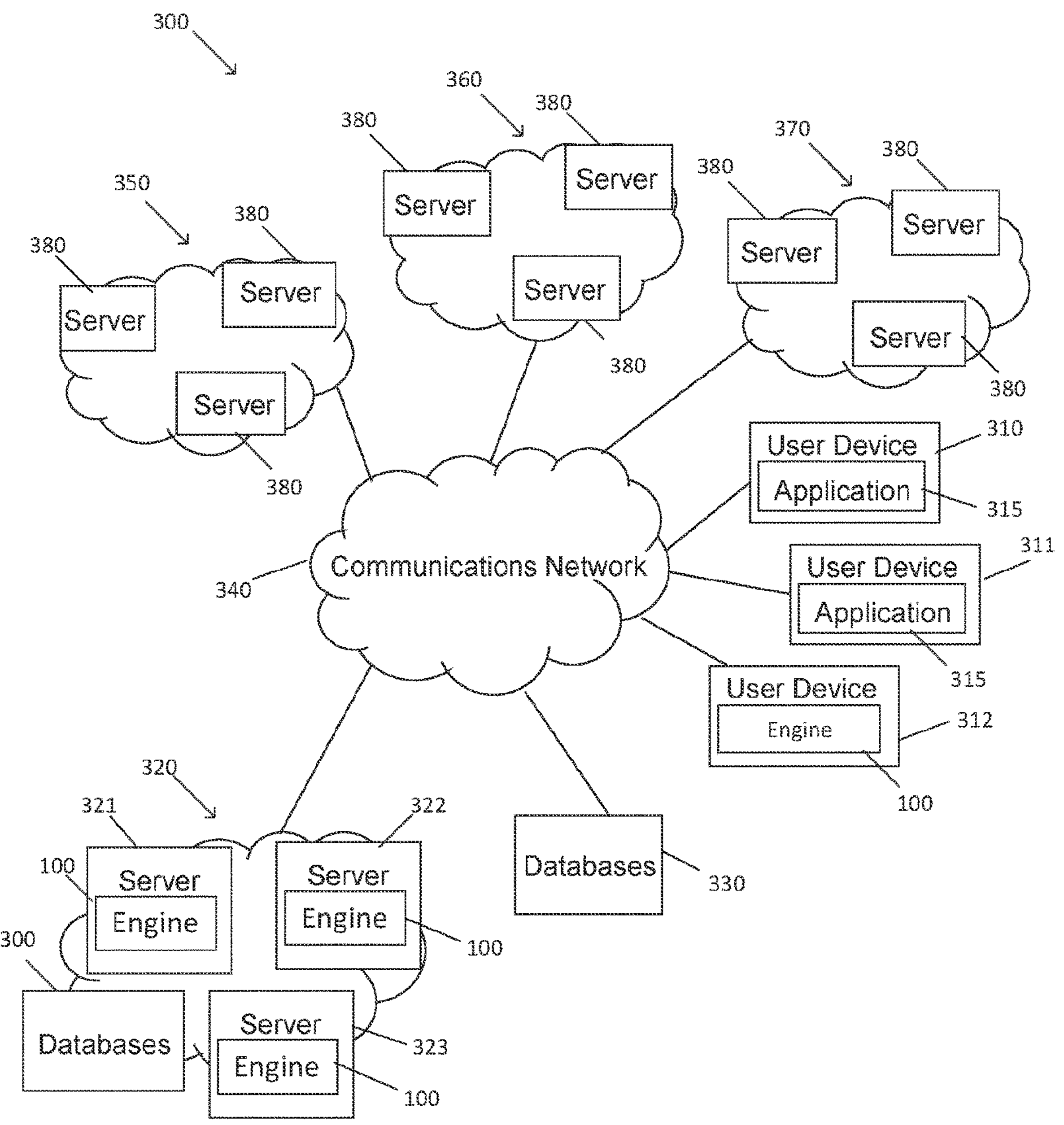
FIG. 3 is an exemplary networked environment for harvesting, parsing, analyzing, and facilitating the removal of fraudulent content on the Internet in accordance with embodiments of the present disclosure.

FIG. 3 is an exemplary networked environment 300 for facilitating detection and monitoring of fraudulent entity networks on the Internet and/or other networked environments in accordance with embodiments of the present disclosure. Environment 300 includes user computing devices 310-312 operatively coupled to a remote computing system 320 including one or more (local) servers 321-323, via a communication network 340, which can be any network over which information can be transmitted between devices communicatively coupled to the network. For example, communication network 340 can be the Internet, an Intranet, virtual private network (VPN), wide area network (WAN), local area network (LAN), and the like. Environment 300 can include repositories or databases 330, which can be operatively coupled to servers 321-323, as well as to user computing devices 310-312, via the communications network 340. Those skilled in the art will recognize that the databases 330 can be incorporated into one or more of servers 321-323 such that one or more of the servers can include databases. In an exemplary embodiment, embodiments of engine 100 can be implemented, independently or collectively, by one or more of servers 321-323, can be implemented one or more of the user computing devices (e.g., the user computing device 312), and/or can be distributed between servers 321-323 and the user computing devices.

User computing device 310-312 can be operated by users to facilitate interaction with engine 100 implemented by one or more of servers 321-323. In exemplary embodiments, the user computing devices (e.g., user computing device 310-311) can include a client side application 315 programmed and/or configured to interact with one or more of servers 321-323. In one embodiment, the client-side application 315 implemented by the user computing devices 310-311 can be a web-browser capable of navigating to one or more web pages hosting GUIs of engine 100. In some embodiments, the client-side application 315 implemented by one or more of user computing devices 310-311 can be an application specific to engine 100 to permit interaction with engine 100 implemented by the one or more servers (e.g., an application that provides user interfaces for interacting with servers 321, 322, and/or 323).

The one or more servers 321-323 (and/or the user computing device 312) can execute engine 100 to search for content available over the communications network 340. For example, engine 100 can be programmed to facilitate searching data sources 350, 360, and 370, which each can include one or more (remote) servers 380 that are programmed to host content and make the content available over the communications network 340. As a non-limiting example, the servers 380 can be webservers configured to host websites that can be searched via one or more search engines and/or APIs using one or more queries generated by engine 100. For example, at least one of data sources 350, 360, and/or 370 can provide an online marketplace website.

Databases 330 can store information for use by engine 100. For example, databases 330 can store queries, extracted item identifiers data sets by engine 100, tags associated with engine 100, and/or any other suitable information/data that can be used by embodiments of engine 100, as described herein. Databases 330 can further store harvested data sets (i.e., harvested data sets 117) and/or include the database 135 and/or the database 145.

Figure 4:
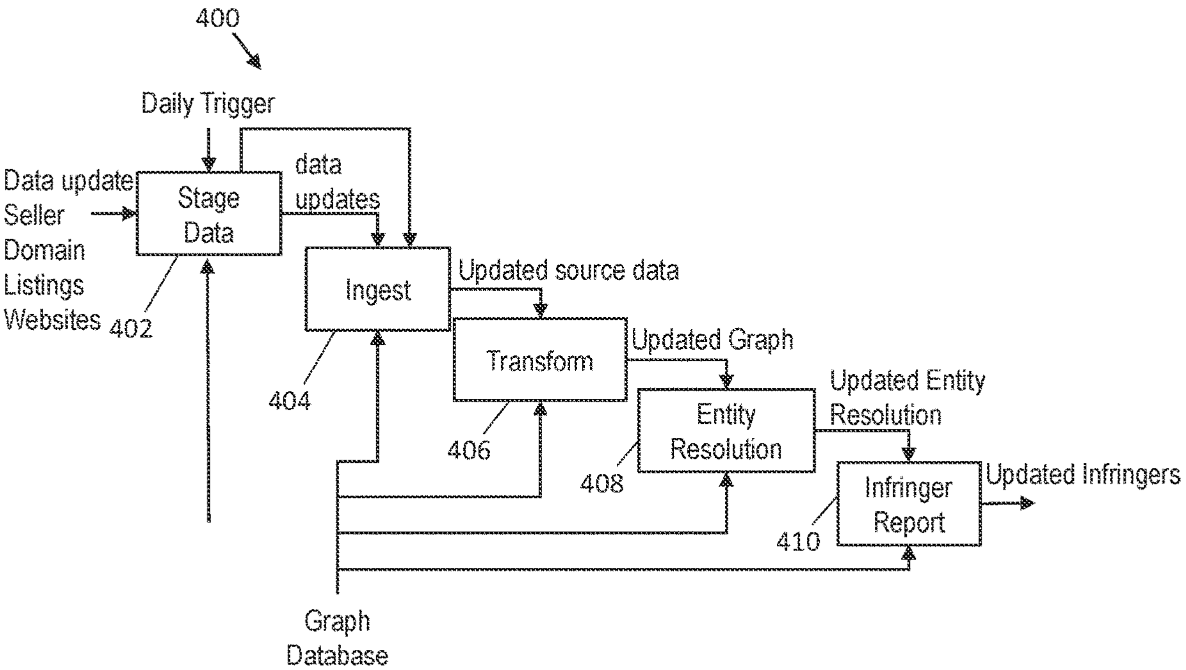
FIG. 4 is a flowchart illustrating an example process for creating and/or updating a graph database and generating a graph and subgraphs to detect fraudulent entity networks in accordance with embodiments of the present disclosure.

FIG. 4 depicts an example process 400 for creating and/or updating an embodiment of the database 145 shown in FIG. 1 and generating a graph and subgraphs to detect fraudulent entity networks. At step 402, the data in the database 135 to be transferred to the database 145 is staged in an intermediate data storage repository. At step 404, the data is ingested into the database 145, and at step 406 the data is transformed (e.g., using canonical representations, hash functions, and/or other data transformations) to align with and update the graph data model of the database 145. At step 408, entity resolution is performed on the graph data model using a community detection algorithm, such as a connected components Pregel algorithm, to disambiguate and group entities in subgraphs in the database 145. An entity identifier that is unique to each disambiguated entity can be added to the documents associated with each disambiguated entity to link the documents related to each respective entity included in the database 145. At step 410, a report can generated based on the graph identifying fraudulent entity networks.

Figure 5:
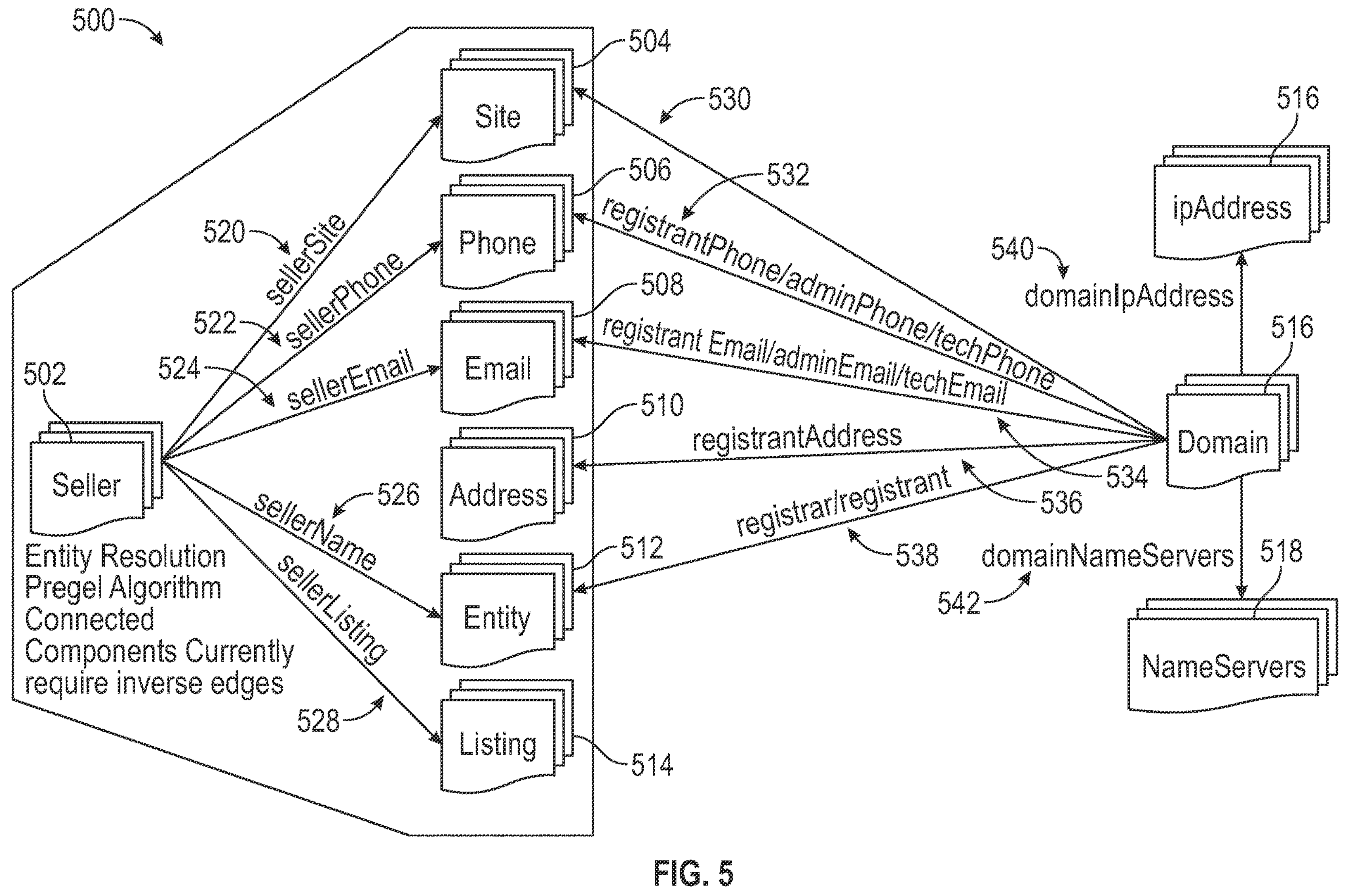
FIG. 5 is a block diagram that depicts a visualization of an embodiment of a graph data model that defined for a graph database in accordance with embodiments of the present disclosure.

FIG. 5 depicts a visualization of an embodiment of a graph data model 500 that can be defined for the database 145. As shown in FIG. 5, the example graph data model 500 can define nodes of a graph to include a "seller" node 502, a "site" node 504, a "phone" node 506, an "e-mail" node 508, an "address" node 510, an "entity" node 512, a "listing" node 514, a "domain" node 504, a "IP address" node 506, and a "domain name server" node 518. The graph data model 500 can define edges between the nodes, which can include keys associated with the nodes, such as a "sellersite" key 520, a "sellerPhone" key 522, a "sellerEmail" key 524, a "sellerName" key 526, a "sellerListing" key 528, a "registrantPhone/adminPhone/techPhone" key 532, a "registrantEmail/adminEmail/techEmail" key 534, a "registrantAddress" key 536, a "registrar/registrant" key 538, a "domainIPaddress" 540, and a "domainNameServers" key 542.

Figure 6:
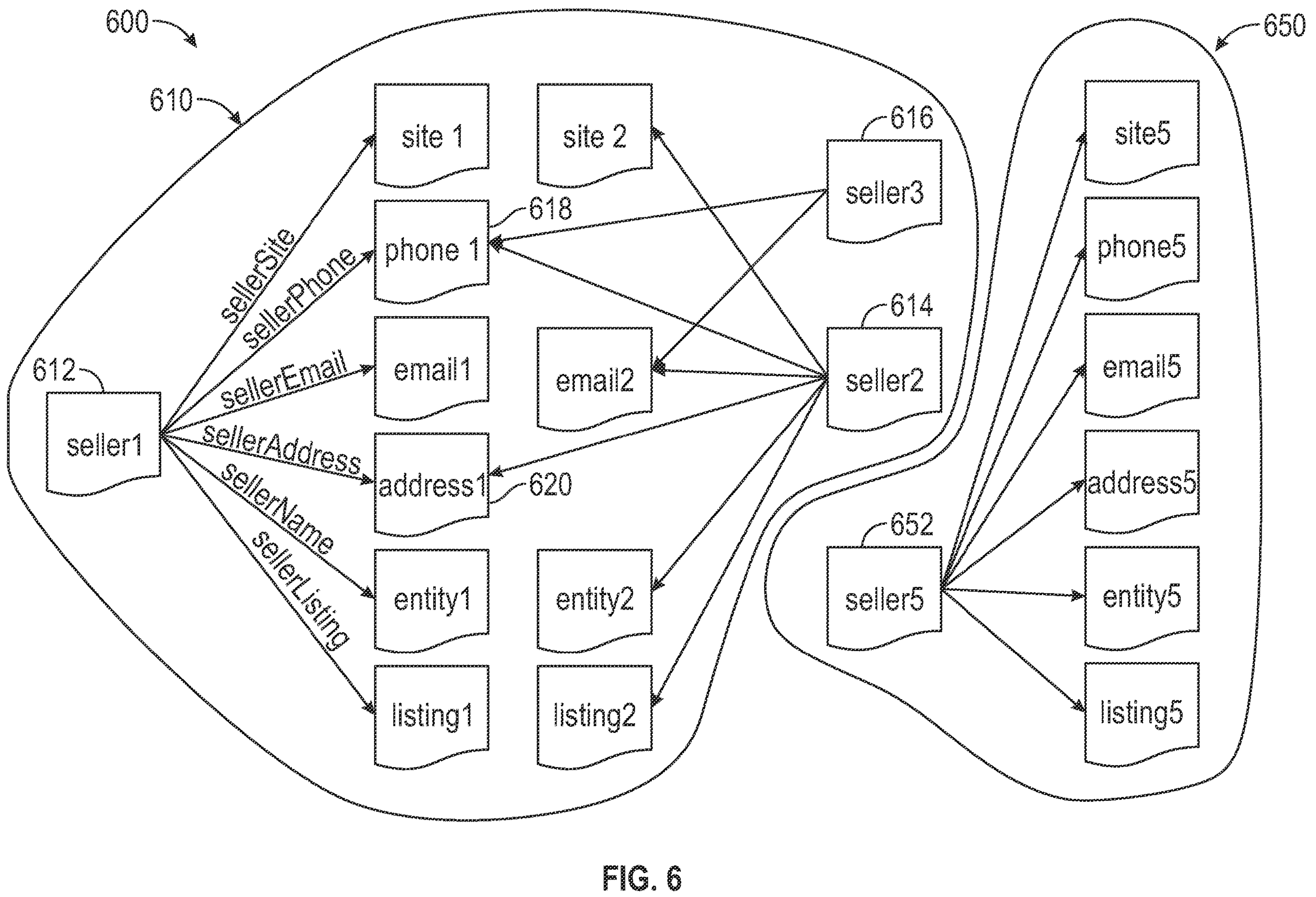
FIG. 6 depicts a simplified example of a graph generated for the data in a graph database based on a graph data model defined for the graph database in accordance with embodiments of the present disclosure.

FIG. 6 depicts a simplified example of a graph 600 that can be generated by enginge 100 for the data in the database 145 based on the graph data model defined for the database 145 and execution of a connected components algorithm. As shown in FIG. 6, the graph 600 includes subgraphs 610 and 650. The subgraphs 610 and 650 define separate and distinct entity networks in the networked environment that are detected by executing the engine 100. The subgraph 610 can include three entities "Seller1", "Seller2", and "Seller3" represented by nodes 612, 614, and 616. The nodes 612, 614, 616 have been connected to each other in the subgraph 610 based on intervening nodes 618 and 620, which represent a phone number, and a physical address. This connection indicates that Seller1 and Seller3 include a common key representing a telephone number, and Seller1 and Seller2 include a common key representing a physical address, respectively. Using these common keys, the engine 100 resolves that Seller1, Seller2, and Seller3 represent the same entity and the nodes in the network associated with the Seller1, Seller2, and Seller 3 are linked together. On the other hand, the subgraph 650 represents an entity network that includes a single entity, "Seller5", represented by node 652. As shown in FIG. 6, the node 652 does not connect to any other "seller" nodes in the graph 600.

FIG. 7 is a graphical user interface 700 illustrating a list 702 of documents and their respective keys in an embodiment of the database 145 for a client account. The list 702 can correspond to all listings available for a daily review based on, for example, harvesting. As shown in FIG. 7, the list includes a "title" column 704, a "cluster connections" column 706, a "URL" column 708, a "Domain" column 710, a "Hosting Status" column 712, a "Registrar" column 714, a "Registrant Name" column 716, and a "First Detected" column 718. The "title" column 704 includes a title of the network content harvested from a data source. In an example embodiment, the title can be extracted from a webpage or the source code for the webpage. The "cluster connections" column 706 identifies a number of connections that exist in a subgraph including the keys from a document. The "URL" column 708 can correspond to a URL address of the network content harvested from a data source. The "Domain" column 710 can correspond to a URL address of the network content harvested from a data source. The "Hosting Status" column 712 can specify whether the domain is active or inactive. The "Registrar" column 714 can specify the registrar through which the domain is registered. The "Registrant Name" column 716 can specify the entity that registered the domain with the Registrar. The "First Detected" column 718 can specify a date that the engine first identified the content from the data source.

In an example interaction with the graphical user interface 700, the user can select a number from the "cluster connections" column 706 to view a cluster summary. As an example, the user can select a number 720 associated with the fourth row in the list. In response to selection of the number, the graphical user interface 700 can render an area that displays the cluster summary.

The graphical user interface 700 can also include selectable options to facilitate one or more action or functions. The options can include a "Detect" option 730, a "Review" option 732, an "Enforce" option 734, a "Report" option 736, and a "Cluster Browser" option 738. In response to selection of the Detect option 730, the engine 100 can navigate to the list 702 of documents to view or review if the list 702 is not currently rendered in the graphical user interface. In response to selection of the Review option 732, the engine 100 can navigate to a graphical user interface that allows the user to review the documents and files associated with the information included in the harvested data that forms the list to allow the user to tag or re-tag the documents as being legitimate or fraudulent. In response to selection of the Enforce option 734, the engine 100 can initiate an enforcement action against one or more of the sellers, listings, domains identified as being fraudulent and/or can initiate action against a fraudulent entity network simultaneously. In response to selection of the Report option 736, the engine 100 can generate one or more reports associated with the documents including statistics and/or statuses associated with fraudulent activities, removal actions against fraudulent entities and/or fraudulent entity networks, and the like. In response to selection of the Cluster Browser option 738, the engine can navigate to a graphical user interface that provide the cluster browser which can render a network graph or subgraphs that include clusters of related or connected nodes forming one or more entity networks.

FIG. 8 is the graphical user interface 700 that includes an area 800 illustrating a cluster summary in response to the user selecting the cluster number 720 in FIG. 7. As shown in FIG. 8, the area 800 includes information about the selected cluster, such as a quantity of entities 802 included in the cluster, a bad to good (or fraudulent to legitimate) ratio 804, a type of entities 806 included in the cluster, a quantity 808 of the type of entity included in the cluster, a type of content 810 included in the cluster, a bad to good (or fraudulent to legitimate) ratio 812 for the content, and a quantity 814 of the type of content in the cluster. The area 800 can also include a "view cluster" option 816. A user can select the "view cluster" option to render a cluster browser that facilitates interaction with a visualization of the cluster in a map or graph.

Figure 9:
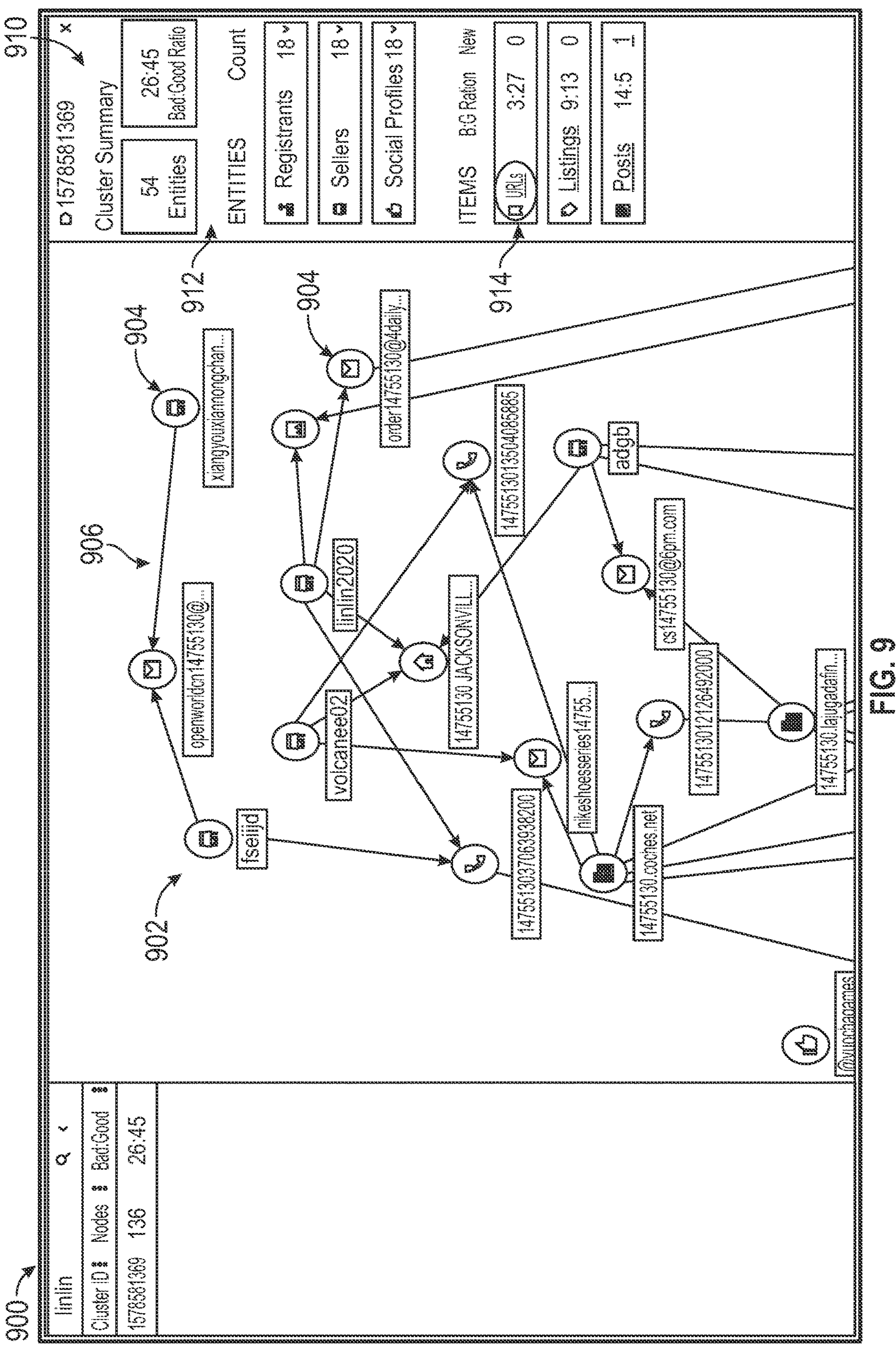
FIG. 9 is a graphical user interface that illustrates a cluster browser within which a visualization of a graph rendered in accordance with embodiments of the present disclosure.

FIG. 9 is a graphical user interface 900 that illustrates a cluster browser within which a visualization of a graph 910 can be rendered in response to a selection of the "view cluster" option 816 in the area 800 shown in FIG. 8. As shown in FIG. 9, the graph 902 has nodes 904 and edges 906, where the nodes 904 include icons to visually depict the type of node, e.g., phone number, e-mail address, physical address, domain name, etc. The cluster browser can also include an area 910 that includes selectable options for entity types 912 and item types 914. From within the cluster browser, a user can search nodes (seller names, personally identifiable information, registrant info, etc.). If desired, the user can then select one of the selectable options to navigate to a grid view of the selected option. As an example, the user can select the item type options (URLs, Listings, or Posts) 914 to be taken to a grid view of the items in the cluster correspond to the selected item type.

FIG. 10 is a graphical user interface 1000 that illustrates a grid view in response to a selection of one of the options 912 and/or 914. As shown in FIG. 10, the graphical user interface 1000 include a list 1002 of documents and their respective keys in an embodiment of the database 145 for a client account. The list 1002 can correspond to a narrowed down selection of listings (as compared to FIG. 7) that are associated with a specific cluster/subgraph detected in the network graph using both deterministic and probabilistic processes described herein. As shown in FIG. 10, the list includes the "title" column 704, the "cluster connections" column 706, the "URL" column 708, the "Domain" column 710, the "Hosting Status" column 712, the "Registrar" column 714, the "Registrant Name" column 716, and the "First Detected" column 718 as described herein.

From the graphical user interface 1000, users can initiate a removal action against some or all of the items in the list as a cluster in order to remove these items at one time with a single action initiated by the engine 100.

Figure 11:
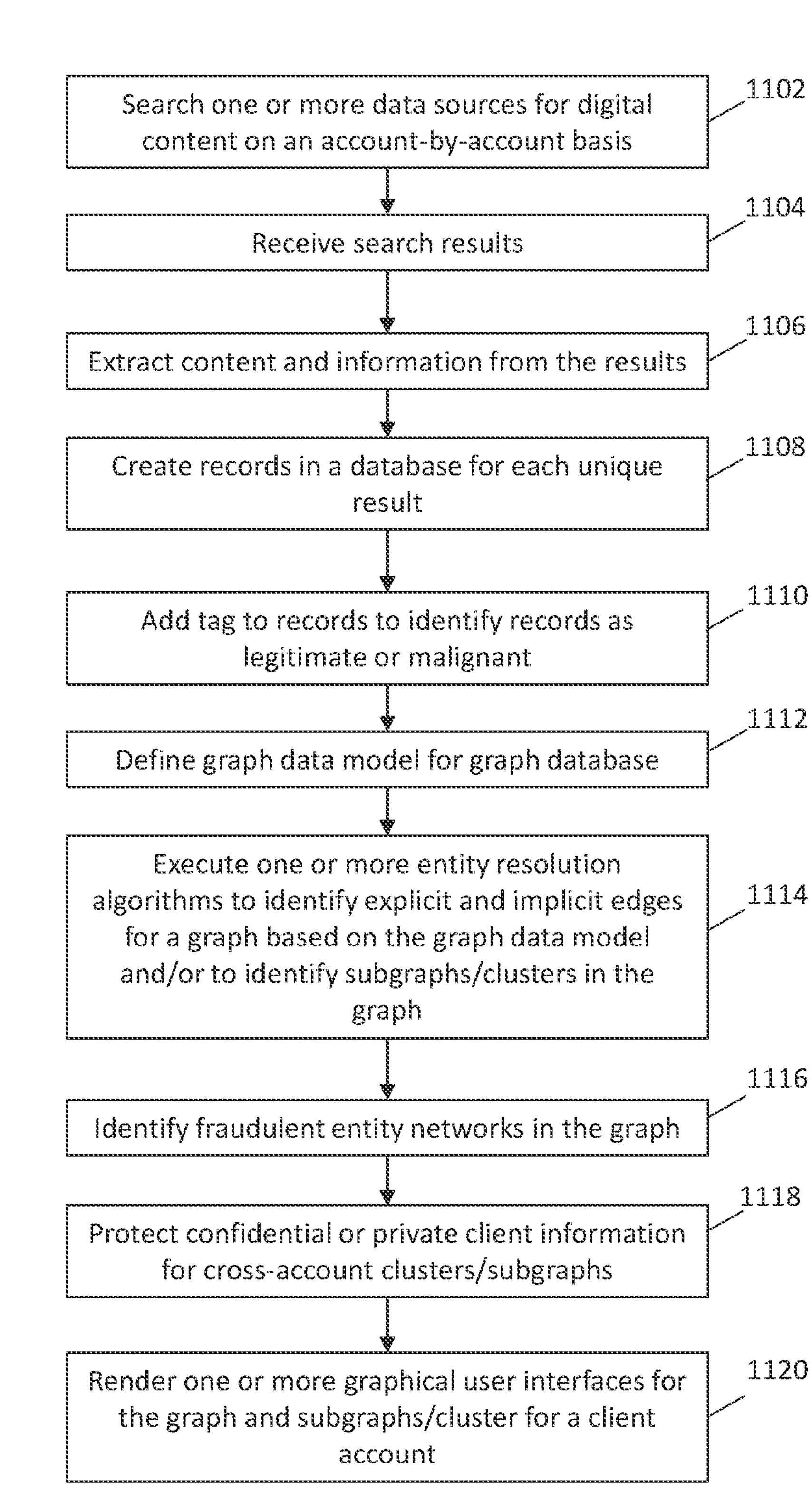
FIG. 11 is flowchart illustrating an example process for detecting, monitoring, and/or removing fraudulent entity networks in accordance with embodiments of the present disclosure.

FIG. 11 is an exemplary method 1100 for parsing and categorizing item identifiers using the fraudulent content detection engine implemented in accordance with embodiments of the present disclosure. At operation 1102, a fraudulent content detection engine (i.e., engine 100) performs content searches on one or more data sources on an account-by-account basis. At operation 1104, search results are in response to the content searches. At operation 1106, the fraudulent content detection engine extracts content and information from results.

At operation 1108, a record is created in a database (e.g., database 135) for each unique result, where the content and information extracted from the results are stored as data in the data fields of the records. At operation 1110, the engine 100 adds tags to the records to identify the records (and the corresponding results) as legitimate or malignant. At operation 1112, a graph data model is defined (including node and edge collections) for a graph database (e.g., database 145) and the records in the database are copied to the graph database, where the records are converted to documents, and the data fields in the records are converted to keys as described herein. At operation 1114, one or more entity resolution algorithms are executed on a graph that includes the documents from the client accounts to identify edges between nodes and/or to define subgraphs/clusters corresponding to separate and distinct entity networks. As one example, a connected components Pregel algorithm can be executed. In some instance, a separate and distinct subgraph/cluster can be identified that is encompassed with a single client account. However, in some instances, a separate and distinct cluster/subgraph can be identified that crosses a boundary from one client account to another client account; thereby expanding the size and scope of the entity network beyond a single client account. At step 1116, using the identified entity networks, fraudulent entity networks are identified. At step 1118, for fraudulent entity networks that cross boundaries between client accounts, the engine is executed to anonymize and/or obfuscate information in the network map/graph, and/or nodes and/or edges of the graph can be omitted or modified to preserve the confidential or private client information. At step 1120, one or more graphical user interfaces can be rendered to a user of a client account as described herein.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A system for detecting and monitoring fraudulent entity networks in a networked environment, the system comprising:

a computing system communicatively coupled to data sources in a networked environment, the data sources including one or more remote servers that are configured to host digital content;

one or more processors being disposed in the computing system, the one or more processors being programmed to:

establish separate and distinct client accounts;

search, for each client account, the digital content hosted by the one or more remote servers in the networked environment to generate separate harvested data sets for each client account;

tag each search result in the harvested data sets as legitimate or malignant based on an analysis of each search result;

generate a network graph by combining data from each search result in the harvested data sets for the client accounts, wherein the client accounts include confidential or private data that is utilized to generate the network graph;

generate clusters in the network graph, the clusters including cross-account clusters that include data from two or more client accounts;

prevent disclosure of the confidential or private data for each of the client accounts to other ones of the client accounts by modifying the cross-account clusters in the network graph to obfuscate the confidential or private data;

in response to receiving a selection or request, alter the scope of the network graph so that only nodes that have been tagged as being associated with malignant content are included in the network graph;

identify one or more fraudulent entity networks based on the clusters in the network graph; and initiate a removal action against the identified one or more fraudulent entity networks, wherein the removal action includes a removal engine initiating an automated takedown against the identified one or more fraudulent entity networks.

2. The system of claim 1, wherein the one or more processors are programmed to:

analyze, for each search result in the harvested data sets for each client account, whether the search result corresponds to legitimate or malignant content; and tag each search result in the harvested data sets for each client as legitimate or malignant based on the analysis.

3. The system of claim 1, wherein the one or more processors are programmed to:

create a plurality of records in a relational database for each for each unique search result in the harvested data sets for each client account; and store data extracted from each result in harvested data set for each client account in data fields of a corresponding one of the plurality of records.

4. The system of claim 3, wherein the one or more processors are further programmed to:

create a graph database;

define a graph data model for the graph database;

copy the plurality of records from the relational database to documents of the graph database;

copy the data fields from the plurality of records in the relational database to keys of documents in the graph database; and generate at least one of node collections or edge collections in the graph database based on the documents and the keys of the documents.

5. The system of claim 4, wherein the data forming the keys are at least one of transformed into their canonical form or converted by a hash algorithm.

6. The system of claim 1, wherein the one or more remote servers in the networked environment are webservers and the digital content hosted by the one or more remote servers is websites including webpages.

7. The system of claim 1, wherein the one or more processors are further programmed to generate at least one of the network graph or the clusters in response to execution of an entity resolution algorithm, wherein the entity resolution algorithm is a connected components algorithm.

8. The system of claim 1, wherein the one or more processors are programmed to:

detect formation of one of the cross-account clusters; and alert a user of one of the client accounts associated with the one of the cross-account clusters.

9. A method for detecting and monitoring fraudulent entity networks in a networked environment, the method implemented via a computing system communicatively coupled to data sources in the networked environment, the data sources including one or more remote servers that are configured to host digital content, and one or more processors being disposed in the computing system, the method comprising:

establishing separate and distinct client accounts;

searching, for each client account, the digital content hosted by the one or more remote servers in the networked environment to generate separate harvested data sets for each client account;

tagging each search result in the harvested data sets as legitimate or malignant based on an analysis of each search result;

generating a network graph by combining data from each search result in the harvested data sets for the client accounts, wherein the client accounts include confidential or private data that is utilized to generate the network graph;

generating clusters in the network graph, the clusters including cross-account clusters that include data from two or more client accounts;

preventing disclosure of the confidential or private data for each of the client accounts to other ones of the client accounts by modifying the cross-account clusters in the network graph to obfuscate the confidential or private data;

in response to receiving a selection or request, altering the scope of the network graph so that only nodes that have been tagged as being associated with malignant content are included in the network graph;

identifying one or more fraudulent entity networks based on the clusters in the network graph; and initiating a removal action against the identified one or more fraudulent entity networks, including initiating, by a removal engine, an automated takedown against the identified one or more fraudulent entity networks.

10. A non-transitory computer-readable medium storing instructions for detecting and monitoring fraudulent entity networks in a networked environment that when executed by one or more processors causes the one or more processors to:

establish separate and distinct client accounts;

search, for each client account, digital content hosted by one or more remote servers in the networked environment to generate separate harvested data sets for each client account;

tag each search result in the harvested data sets as legitimate or malignant based on an analysis of each search result;

generate a network graph by combining data from each search result in the harvested data sets for the client accounts, wherein the client accounts include confidential or private data that is utilized to generate the network graph;

generate clusters in the network graph, the clusters including cross-account clusters that include data from two or more client accounts;

prevent disclosure of the confidential or private data for each of the client accounts to other ones of the client accounts by modifying the cross-account clusters in the network graph to obfuscate the confidential or private data;

in response to receiving a selection or request, alter the scope of the network graph so that only nodes that have been tagged as being associated with malignant content are included in the network graph;

identify one or more fraudulent entity networks based on the clusters in the network graph; and initiate a removal action against the identified one or more fraudulent entity networks, wherein the removal action includes a removal engine initiating an automated takedown against the identified one or more fraudulent entity networks.

11. The medium of claim 10, wherein the client accounts include confidential or private data is utilized to generate the network graph and execution of the instructions causes the one or more processors to:

prevent disclosure of the confidential or private data for each of the client accounts to other ones of the client accounts by modifying the cross-account clusters in the graph to at least one of obfuscate the confidential or private data or remove the confidential or private data.

12. The medium of claim 10, wherein execution of the instructions causes the one or more processors to:

analyze, for each search result in the harvested data sets for each client account, whether the search result corresponds to legitimate or malignant content; and tag each search result in the harvested data sets for each client as legitimate or malignant based on the analysis.

13. The medium of claim 10, wherein execution of the instructions causes the one or more processors to:

create a plurality of records in a relational database for each for each unique search result in the harvested data sets for each client account; and store data extracted from each result in harvested data set for each client account in data fields of a corresponding one of the plurality of records.

14. The medium of claim 13, wherein execution of the instructions causes the one or more processors to:

create a graph database;

define a graph data model for the graph database;

copy the plurality of records from the relational database to documents of the graph database copy the data fields from the plurality of records in the relational database to keys of documents in the graph database; and generate at least one of node collections or edge collections in the graph database based on the documents and the keys of the documents.

15. The medium of claim 14, wherein the data forming the keys are at least one of transformed into their canonical form or converted by a hash algorithm.

16. The medium of claim 10, wherein the one or more remote servers in the networked environment are webservers and the digital content hosted by the one or more remote servers is websites including webpages.

17. The medium of claim 10, wherein execution of the instructions causes the one or more processors to generate at least one of the network graph or the clusters in response to execution of an entity resolution algorithm, wherein the entity resolution algorithm is a connected components algorithm.

18. The medium of claim 10, wherein execution of the instructions causes the one or more processors to:

detect formation of one of the cross-account clusters; and alert a user of one of the client accounts associated with the one of the cross-account clusters.

* * * * *